April 25, 1944.　　　D. J. AYERS　　　2,347,388
BRAKE
Filed Sept. 4, 1941　　　2 Sheets-Sheet 1

INVENTOR
DONALD J. AYERS
BY
ATTORNEY

April 25, 1944.   D. J. AYERS   2,347,388
BRAKE
Filed Sept. 4, 1941   2 Sheets-Sheet 2

INVENTOR
DONALD J. AYERS
BY
ATTORNEY

Patented Apr. 25, 1944

2,347,388

UNITED STATES PATENT OFFICE 2,347,388

BRAKE

Donald J. Ayers, South Bend, Ind., assignor to Bendix Aviation Corporation, South Bend, Ind., a corporation of Delaware Application September 4, 1941, Serial No. 409,568

4 Claims. (Cl. 188—78)

This invention relates to brakes, and particularly to those portions of brakes where the frictional stopping force is directly exerted.

An object of the invention is to furnish an hydraulic brake in which two shoes are applied with equalized force exerted simultaneously at opposite sides of the brake by a mechanism actuated by a single hydraulic cylinder.

A second object of my invention is to provide a brake having a plurality of shoes which are individually shiftable to anchor at different points and to which applying force is transmitted by one or more servo applying devices. Thus, the hydraulic cylinder mentioned above serves to move one or more servo elements against a rotating brake drum, and the rotation of the drum tends to carry the servo brake elements around the brake, the movement of the said brake elements being adapted to exert an applying force on one or more brake shoes.

A feature of my invention is the connecting of a cylinder casing to a servo device and the connecting of a piston reciprocable in the casing to a second servo device at the opposite side of the brake from the first servo device.

Other objects and features of my invention will be apparent during the course of the following description, reference being had therein to the accompanying drawings, in which.

Figure 1:
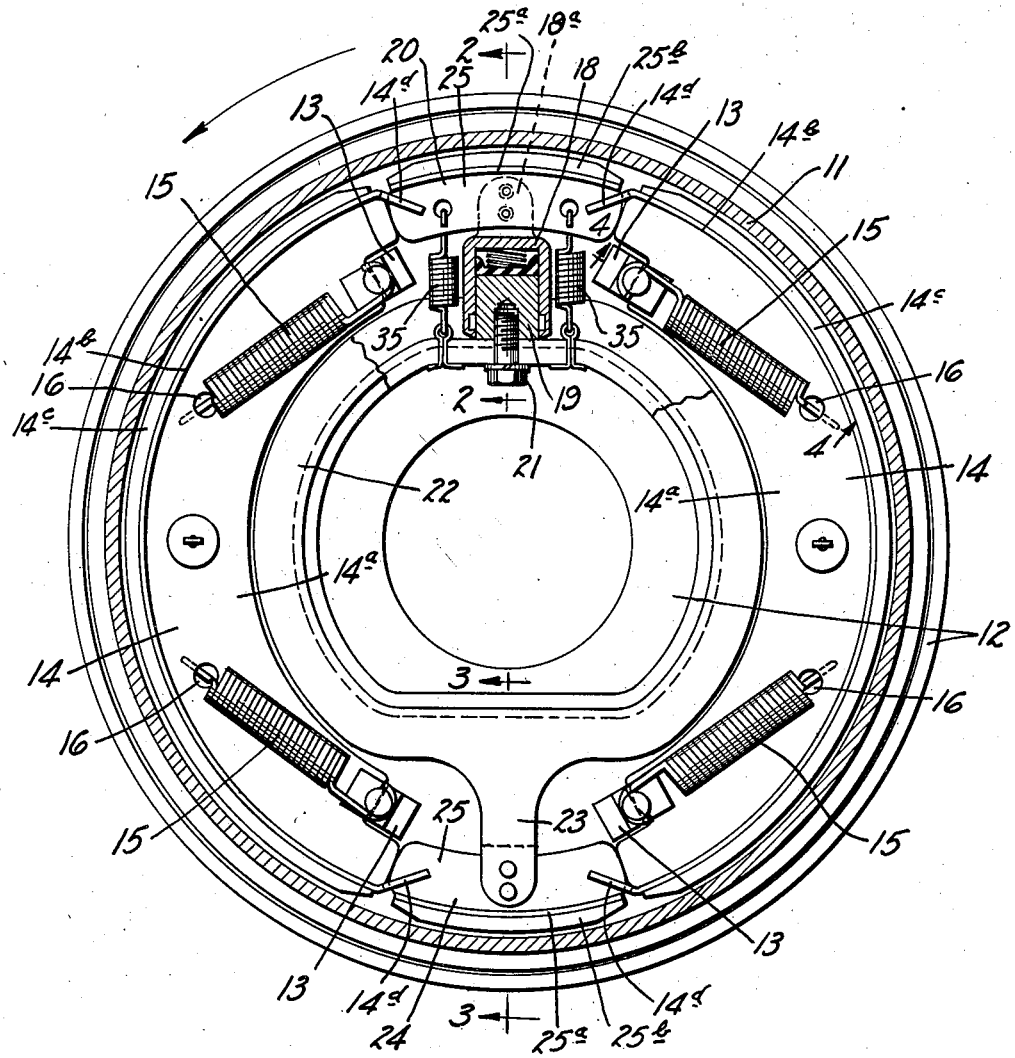
Figure 1 is a section taken through a brake assembly on the plane just inside the head of a brake drum, showing brake shoes in side elevation.

Figure 1, as illustrated, is a wheel brake assembly comprising a rotatable brake drum 11, a non-rotatable support or backing plate 12, a plurality of anchors 13 mounted in spaced positions on the backing plate, a plurality of individually shiftable brake shoes 14 adapted to be moved into frictional contact with the brake drum 11 and adapted to anchor at one end or the other on one of the anchors 13 according to the direction of rotation of the brake drum at the time the shoes contact the drum, and applying means for moving the shoes against the drum to inhibit drum rotation. It will be noted that an anchor 13 is provided adjacent each end of each shoe 14 so that the shoes may anchor at either end according to the direction of drum rotation. A plurality of positioning or retaining springs 15 normally hold each end of each shoe against its adjacent anchor to maintain the shoes in brake released position. Each shoe 14 comprises a web portion 14a, which transmits the anchoring torque to the anchors 13, a rim 14b and lining or friction facing portion 14c. Each shoe rim 14b has at each of its ends a pair of prong-like projections 14d, the purpose of which will appear presently.

Figure 4:
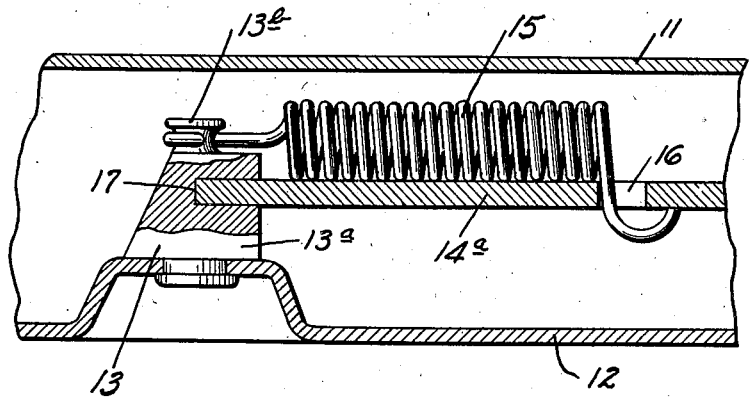
Figure 4 is a section taken on the line 4—4 of Figure 1.

Each of the anchors 13 (see Figure 4) may comprise a body portion 13a riveted or otherwise secured to the backing plate 12 and a projecting button 13b on the top of the anchor to catch one end of the associated tension spring 15. The other end of spring 15 may extend through one of a plurality of openings 16 in the webs of the shoes 14a, and said spring end may contact the shoe web on the side of the web away from the body of the spring, to prevent unwarranted lateral movement of the spring away from the shoe web. The shoe webs extend into openings 17 in the body portions 13a of the anchors so that lateral positioning of the shoes is in part accomplished by the anchors.

The applying means or means for moving the shoes against the brake drum includes a hydraulic cylinder or casing 18 having reciprocable therein a piston 19. The casing 18 has an ear 18a extending therefrom which is secured by suitable means to a servo device or shoe 20. The piston 19 is connected by a screw 21 or other suitable means to a yoke 22 which has curved side portions extending around the center of the brake assembly to the side of the brake opposite the hydraulic cylinder and piston unit. At the side of the brake assembly opposite the said cylinder and piston unit, the yoke has an ear 23 which is secured by suitable means to a servo device or shoe 24. Each of the servo shoes 20 and 24 extends between adjacent ends of the anchoring shoes 14 and each of the said servo shoes 20 and 24 comprises a web portion 25 which is secured to the ear of the cylinder casing or yoke respectively, as described above, a rim portion 25a, and a friction lining portion 25b. The projections 14d on the ends of the rims of the shoes 14 embrace the webs of the servo shoes 20 and 24 to position the servo shoes laterally and to aid in holding the whole assembly in position. A pair of return springs 35 under tension connect the servo shoe 20 to the adjacent side of the yoke 22, to normally hold the piston 19 drawn fully into the cylinder 18. It may be well to point out that the positions of the cylinder and piston and their connection to the shoes and yoke might be reversed without in any sense departing from the scope of my invention.

Figures 2, 3:
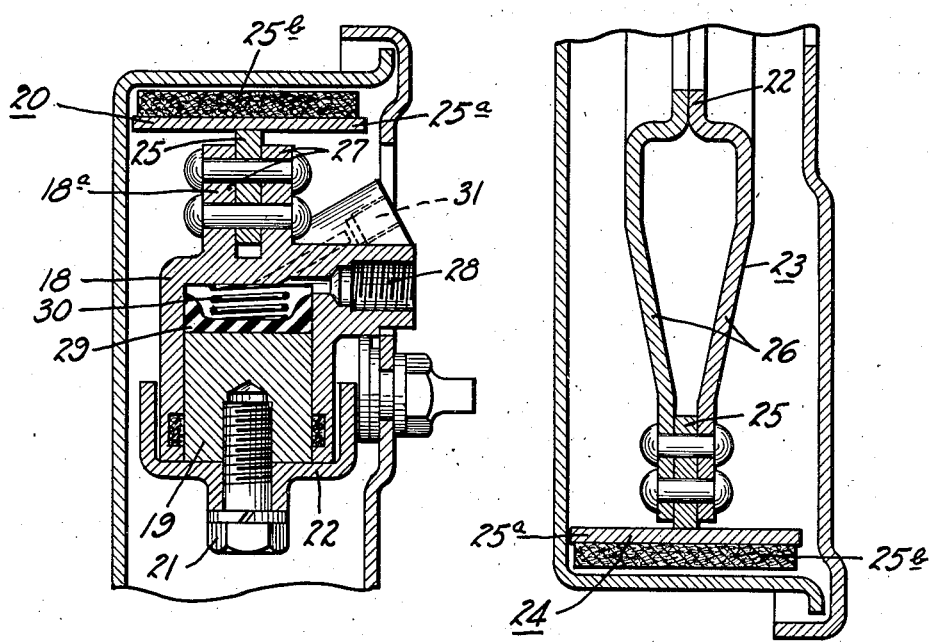
Figure 2 is a section taken on the line 2—2 of Figure 1.
Figure 3 is a section taken on the line 3—3 of Figure 1.

With particular reference to the manner of connecting the servo shoes to the piston and cylinder unit, I have illustrated the ear 23 of the lower portion of the yoke 22 in Figure 3 as having a pair of arms or forks 26 which clamp the web of the servo shoes 24 between them. In Figure 2

I have illustrated the ear 18a of the casing or cylinder 18 as having a pair of arms 27 which clamp between them the web of the servo shoe 20.

A fluid inlet 28 may be provided in the side of the casing or cylinder 18 to admit fluid under pressure which operates between the upper end of the piston 19 and the wall of the cylinder 18. On the said upper end of the piston 19 is a sealing cup 29 of the usual type above which sealing cup is a compression spring 30 which holds the cup in place and maintains the volume of fluid-filled space between the piston and cylinder at a predetermined minimum. A bleeder inlet 31 may be provided in the cylinder 18 at the highest point. Through the inlet 28 the interior of the cylinder 18 may be connected to a hydraulic pressure system of the well known type so that fluid under pressure may be admitted to the space between the cylinder and piston to cause relative movement therebetween.

The operation of my improved brake device is as follows:

When it is desired to operate the brake, fluid under pressure may be forced into the space between the upper end of the piston 19 and the casing of the cylinder 18. The pressure exerted by this fluid tends to push the cylinder upward and the piston downward with the result that the servo shoes 20 and 24 are simultaneously moved against the brake drum 11. If the vehicle is in motion and the brake drum is rotating, the servo shoes 20 and 24 will, upon coming into contact with the drum, tend to rotate therewith. This tendency to rotate will move them against one end of brake shoes 14 moving the shoes 14 into the drum to create an effective stopping force. If the drum is rotating in the direction indicated by the arrow in Figure 1, the right shoe 14 will anchor at the top of the brake and the left shoe 14 will anchor at the bottom of the brake. On the other hand, if the direction of rotation of the drum is opposite the direction of the arrow, the left shoe 14 will anchor at the top of the brake and right shoe 14 will anchor at the bottom of the brake. In either case, both shoes 14 are self-energizing, i. e., the wrapping effect of the drum rotation tends to increase the frictional stopping force. Upon diminution of the fluid pressure in the cylinder 18, the return springs 35 move the servo shoes 20 and 24 back to released position, and springs 15 position the shoes 14.

Although I have described a single embodiment of my invention, it will be readily apparent that numerous other applications of the fundamental idea may be made. I therefore do not intend to limit the scope of my invention to the embodiment discussed herein, but only by the terms of the appended claims.

I claim:

1. A brake assembly comprising, in combination, a rotatable brake drum, two main shoes therein each of which includes a web and a rim and each of which is shiftable to anchor at one end or the other depending on the direction of drum rotation, anchors against which the main shoes rest in release and which take the anchoring torque of the shoes when they are applied to the drum, two servo shoes each between the main shoes at one end thereof, the rims of said main shoes having extensions at each end thereof which hold the servo shoes in lateral alignment with the main shoes to maintain surface contact between the webs of the servo shoes and the webs of the main shoes, and means to spread said servo shoes to contact the drum whereby the drum as it rotates rotates the servo shoes which apply the main shoes for either direction of drum rotation, said means comprising a hydraulically actuated member fixed to one of said servo shoes and a second hydraulically actuated member movable relatively to the first and engaging a part fixed to the other servo shoe.

2. A brake assembly comprising in combination, a rotatable brake drum, two main shoes therein each of which includes a web and a rim and each of which is shiftable to anchor at one end or the other depending on the direction of drum rotation, anchors which take the anchoring torque of the main shoes when they are applied to the drum, two servo shoes each between the main shoes at one end thereof, the rims of said main shoes having extensions at each end thereof which hold the servo shoes in lateral alignment with the main shoes to maintain surface contact between the webs of the servo shoes and the webs of the main shoes, and means to spread said servo shoes to contact the drum whereby the drum as it rotates rotates the servo shoes which apply the main shoes for either direction of drum rotation, said means comprising a hydraulically actuated member fixed to one of said servo shoes and a second hydraulically actuated member movable relatively to the first and engaging a part fixed to the other servo shoe.

3. A brake assembly comprising in combination, a rotatable brake drum, two main shoes therein each of which includes a web and a rim and each of which is shiftable to anchor at one end or the other depending on the direction of drum rotation, anchors which take the anchoring torque of the main shoes when they are applied to the drum, two servo shoes each between the main shoes at one end thereof, the rims of said main shoes having extensions at each end thereof which hold the servo shoes in lateral alignment with the main shoes to maintain surface contact between the webs of the servo shoes and the webs of the main shoes, and means to spread said servo shoes to contact the drum whereby the drum as it rotates rotates the servo shoes which apply the main shoes for either direction of drum rotation.

4. A brake assembly comprising in combination, a rotatable brake drum, two main shoes therein each of which includes a web and a rim and each of which is shiftable to anchor at one end or the other depending on the direction of drum rotation, anchors against which the main shoes rest in release and which take the anchoring torque of the shoes when they are applied to the drum, two servo shoes each between the main shoes at one end thereof, the rims of said main shoes having extensions at each end thereof which hold the servo shoes in lateral alignment with the main shoes to maintain surface contact between the webs of the servo shoes and the webs of the main shoes, the webs of said main shoes being notched at each end to accommodate the anchors, and means to spread said servo shoes to contact the drum whereby the drum as it rotates rotates the servo shoes which apply the main shoes for either direction of drum rotation.

DONALD J. AYERS.